US008855812B2

(12) United States Patent
Kapoor

(10) Patent No.: US 8,855,812 B2
(45) Date of Patent: Oct. 7, 2014

(54) SYSTEM AND METHOD FOR ROBOT SAFETY AND COLLISION AVOIDANCE

(75) Inventor: Chetan Kapoor, Austin, TX (US)

(73) Assignee: Chetan Kapoor, Austin, TX (US)

( * ) Notice: Subject to any disclaimer, the term of this patent is extended or adjusted under 35 U.S.C. 154(b) by 643 days.

(21) Appl. No.: 13/188,602

(22) Filed: Jul. 22, 2011

(65) Prior Publication Data

US 2012/0022689 A1  Jan. 26, 2012

Related U.S. Application Data

(60) Provisional application No. 61/367,009, filed on Jul. 23, 2010.

(51) Int. Cl.
*G06F 19/00* (2011.01)

(52) U.S. Cl.
USPC ........... 700/245; 700/247; 700/249; 700/248; 706/14; 307/125; 703/7; 703/2

(58) Field of Classification Search
USPC ........... 700/259, 255, 262, 250, 245, 248, 21, 700/247, 249; 900/1, 47, 49; 358/103, 107; 180/168, 169; 706/14; 307/125; 703/7, 703/2, 13
See application file for complete search history.

(56) References Cited

U.S. PATENT DOCUMENTS

| 4,706,120 | A   | * | 11/1987 | Slaughter et al. | 348/114 |
|-----------|-----|---|---------|------------------|---------|
| 6,734,581 | B1  | * | 5/2004  | Griffis          | 307/125 |
| 7,072,740 | B2  | * | 7/2006  | Iribe et al.     | 700/245 |
| 7,343,222 | B2  | * | 3/2008  | Solomon          | 700/245 |
| 8,112,176 | B2  | * | 2/2012  | Solomon          | 700/245 |
| 8,639,644 | B1  | * | 1/2014  | Hickman et al.   | 706/14  |
| 2005/0251291 | A1 | * | 11/2005 | Solomon       | 700/245 |
| 2006/0133573 | A1 | * | 6/2006  | Wong et al.   | 378/117 |
| 2007/0199108 | A1 | * | 8/2007  | Angle et al.  | 901/17  |
| 2008/0042076 | A1 | * | 2/2008  | Miller et al. | 250/491.1 |
| 2009/0177323 | A1 | * | 7/2009  | Ziegler et al. | 700/259 |
| 2009/0234499 | A1 | * | 9/2009  | Nielsen et al. | 700/250 |
| 2010/0152899 | A1 | * | 6/2010  | Chang et al.  | 700/262 |
| 2010/0286797 | A1 | * | 11/2010 | Liu et al.    | 700/21  |
| 2010/0286824 | A1 | * | 11/2010 | Solomon       | 700/248 |
| 2011/0172822 | A1 | * | 7/2011  | Ziegler et al. | 700/259 |
| 2012/0022689 | A1 | * | 1/2012  | Kapoor         | 700/255 |
| 2012/0185094 | A1 | * | 7/2012  | Rosenstein et al. | 700/259 |
| 2012/0303160 | A1 | * | 11/2012 | Ziegler et al. | 700/259 |

OTHER PUBLICATIONS

Spencer, et al., "Collision Avoidance Techniques for Tele-Operated and Autonomous Manipulators in Overlapping Workspaces", 2007 [http://www.robotics.utexas.edu/rrg/docs/ pubs/publications/ICRA08-CollisionAvoidance.pdf].

* cited by examiner

*Primary Examiner* — Ronnie Mancho
(74) *Attorney, Agent, or Firm* — Jeffrey Van Myers; Artie A. Pennington

(57) ABSTRACT

A system and method for developing an intrusion detection zone substantially surrounding mobile components of a robot, training a model of the robot to accept selected intrusions into the intrusion detection zone, and, during application operations, triggering an application interrupt upon detecting an unexpected intrusion.

17 Claims, 7 Drawing Sheets

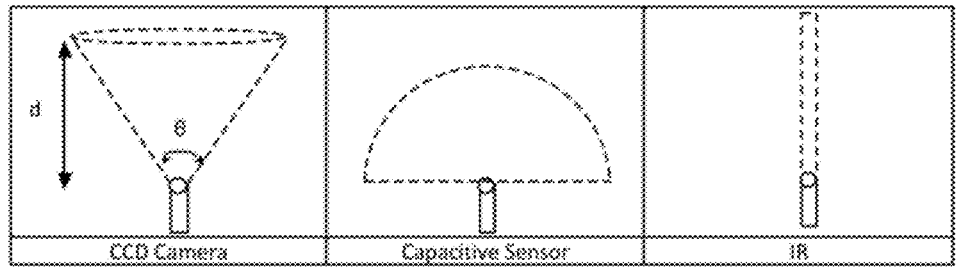
Fig. 8
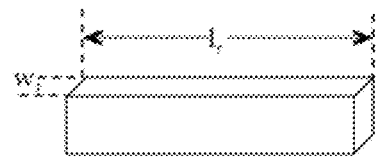  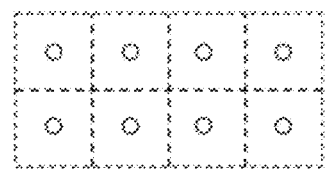
Fig. 9a  Fig. 9b  Fig. 9c
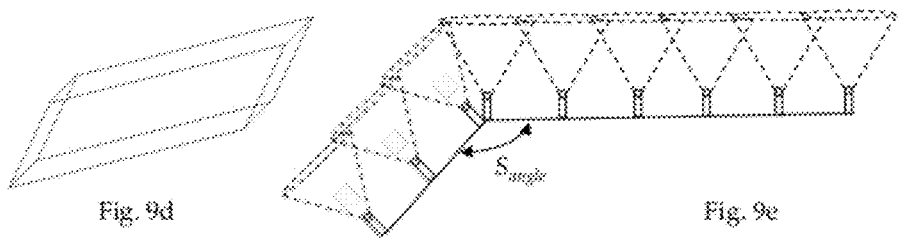
Fig. 9d  Fig. 9e
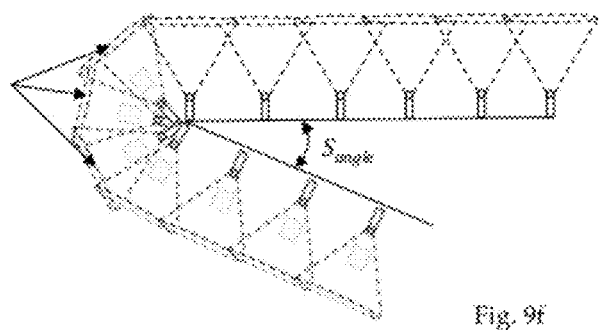 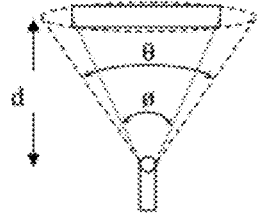
Fig. 9f  Fig. 9g

SYSTEM AND METHOD FOR ROBOT SAFETY AND COLLISION AVOIDANCE

CROSS-REFERENCE TO RELATED APPLICATIONS

This application claims priority to the U.S. Provisional Patent Application Ser. No. 61/367,009 ("Parent Provisional"), filed 23 Jul. 2010. The subject matter of this application is related to U.S. application Ser. No. 12/910,124 ("Related Application"), filed 22 Oct. 2010. (Collectively, "Related References"). The subject matter of the Related References, each in its entirety, is expressly incorporated herein by reference.

BACKGROUND OF THE INVENTION

1. Field of the Invention

The present invention relates generally to control of robots, for example, but not limited to industrial, medical, and defense robots, and more particularly to robot safety and collision avoidance.

2. Description of the Related Art

In general, in the descriptions that follow, I will italicize the first occurrence of each special term of art which should be familiar to those skilled in the art of robot control systems. In addition, when I first introduce a term that I believe to be new or that I will use in a context that I believe to be new, I will bold the term and provide the definition that I intend to apply to that term. In addition, throughout this description, I may sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, I may refer to the mutually exclusive boolean states as logic_0 and logic_1. Of course, as is well know, consistent system operation can be obtained by reversing the logic sense of all such signals, such that signals described herein as logically true become logically false and vice versa. Furthermore, it is of no relevance in such systems which specific voltage levels are selected to represent each of the logic states.

In my Related Application, I have disclosed a method and apparatus for developing robotic applications in an inherently safe environment in which either the robot or its workcell (or both) is simulated. Unfortunately, once installed and operating within its workcell, the robot may be exposed to unanticipated intrusions. Preventing collisions with any intruding object, be it animate or inanimate, is critical to the safety of the system, especially in applications where the environment has not been fully predetermined and intrusions into the robot workspace are likely.

One technique often used in suitable applications relies on perimeter guarding, wherein various types of physical and electronic exclusion perimeters are employed, e.g., wire mesh cages, light curtains, pressure pads, etc. These perimeters may be electrically or electronically tied to the robot control system such that a detected intrusion results in stopping of the robot motion and other equipment comprising the workcell. One drawback of such systems is that the size of the perimeter has to be established given the worst case scenario of the robot operation. Such a scenario should assume that the robot is working in its full range of motion (even though the specific application for which it is programmed for may not require it), and also the worst case stopping distance in the case of an emergency stop. As a result, these perimeters tend to consume valuable factory space.

Recently, advances have been made in the area of intelligent perimeter guarding. For example, the PILZ SafetyEYE (www.safetyeye.com) is an overhead camera based system that continuously monitors for intrusions, and, based on the spatial relationship between the intruding object and the robotic components, intelligently slows the robot motion and, in some situations, even bringing it to a full stop. One limitation of this approach is that it only detects intrusion into the workspace of the robot and does not necessarily identify any inadvertent changes that may have taken place inside the workspace, e.g., accidental movement of a workspace fixture. Also, this technique still uses gross models, and thus is limited only to perimeter guarding.

Other developments, primarily still in research, are in the area of using sensing to continuously create a world model that can be used for collision avoidance. For example, some mobile robots use laser range scanners to detect any obstacles around them and thus avoid colliding with them. To date, however, such techniques have not been successfully extended to articulated robot manipulators, as they require a 3D world model, which is significantly harder to develop in 3D space. At present, 3D vision systems and range scanning cameras are being adapted for use in such applications. However, a complete world model cannot be guaranteed as, usually, at least some significant portion of the robot and its workspace may be occluded to the vision components. Despite these advancements in world modeling, all they really achieve is to provide a 3D representation of the world that the robot has to avoid colliding with. While this may work satisfactorily in applications wherein the robot is never required to make contact with the environment (e.g., another vehicle on the road in the case of an autonomously driven car), manufacturing robots, bomb handling robots, and the like, are required to interact with objects in their workspace. Adapting the 3D world model to deal with such "accepted contacts" with various parts of the 3D world requires sophisticated image analysis to identify various objects in the 3D world model, and, upon object recognition, to allow context specific contact between the robot and such objects.

From the foregoing it will be apparent that there is still a need for an improved method to provide a system and method for improved robot safety and collision avoidance which allows for accepted contact between robot components and specific, identifiable objects in the environment of the robot.

BRIEF SUMMARY OF THE INVENTION

In accordance with a first embodiment of my invention, I provide a robot safety system in which a robot having at least one mobile component is instrumented with a plurality of proximity sensors adapted to develop an intrusion detection zone substantially surrounding the mobile component, each sensor being adapted to detect an intrusion into a respective portion of the zone. A model is developed of at least one predefined robot application comprising a set of accepted intrusions during each of a plurality of predefined time intervals comprising the application. A controller is adapted to control the robot to execute the application. During each time interval of the application, the controller monitors for detected intrusions, and triggers an interrupt of the application in response to a detected intrusion not in the set of accepted intrusions for the respective time interval.

In accordance with a second embodiment of my invention, I provide a method for operating a robot having a mobile component. During a first time period, the robot is instrumented with a plurality of proximity sensors so as to develop an intrusion zone substantially surrounding the mobile component of the robot, each sensor being adapted to detect an intrusion into a respective portion of the zone; and, then, a model of at least one predefined robot application is developed, the model comprising a set of accepted intrusions during each of a plurality of predefined time intervals comprising the application. During a second time period, the application is executed; but, during each time interval of the application, detected intrusions are monitored, and, an interrupt of the application is triggered in response to a detected intrusion not in the set of accepted intrusions for the respective time interval.

In accordance with a third embodiment of my invention, I provide a robot safety system in which a robot having at least one mobile component is instrumented with a plurality of sensors so as to develop an intrusion zone substantially surrounding the mobile component, each sensor being adapted to develop a respective sensor signal. A model is developed of at least one predefined robot operation comprising a set of expected sensor signals for each sensor at each of a plurality of predefined time intervals comprising the operation. A controller is adapted to control the robot to execute the operation. At each of the predefined time intervals, the controller correlates the sensor signal developed by each of the sensors during the operation to the respective expected sensor signal, and triggers an interrupt of the operation if the developed sensor signal and the expected sensor signal do not correlate.

In accordance with a fourth embodiment of my invention, I provide a method for operating a robot. The robot is instrumented with a plurality of sensors so as to develop an intrusion zone surrounding a mobile component of the robot, each sensor being adapted to develop a respective sensor signal; and, then, a model of at least one predefined robot operation is developed, the model comprising an expected sensor signal for each sensor at each of a plurality of predefined time intervals comprising the operation. The operation is then executed; but, at each of the predefined time intervals, the sensor signal developed by each of the sensors during the operation is correlated to the respective expected sensor signal, and an exception is signaled if the developed sensor signal and the expected sensor signal do not correlate.

In accordance with a fifth embodiment of my invention, I provide a method for improved safety of industrial robots by avoiding undesired collisions. The robot is instrumented with a plurality of sensors to create an intrusion zone around movable components of the robot, each sensor adapted to develop a sensor signal during an operation of the robot; and then a model is developed for each robot component to determine expected sensor signals for each sensor at predefined time intervals in the operation of the robot due to intrusions of other robot components. During each time interval of the operation of the robot, sensor signals developed by the sensors are correlated to the respective expected sensor signal; and an exception is signaled in response to any non-correlation.

I submit that this invention provides a system and method for improved robot safety and collision avoidance which allows for accepted contact between robot components and specific, identifiable objects in the environment of the robot.

BRIEF DESCRIPTION OF THE DRAWINGS

FIG. 5, comprising

FIG. 8 illustrates typical fields-of-view of known proximity sensors, including CCD camera, capacitive sensor and infra-red ("IR").

FIG. 9, comprising FIGS. 9a-i, illustrates sensor placement selected to develop the enveloping volume on selected forms of links.

Figure 1:
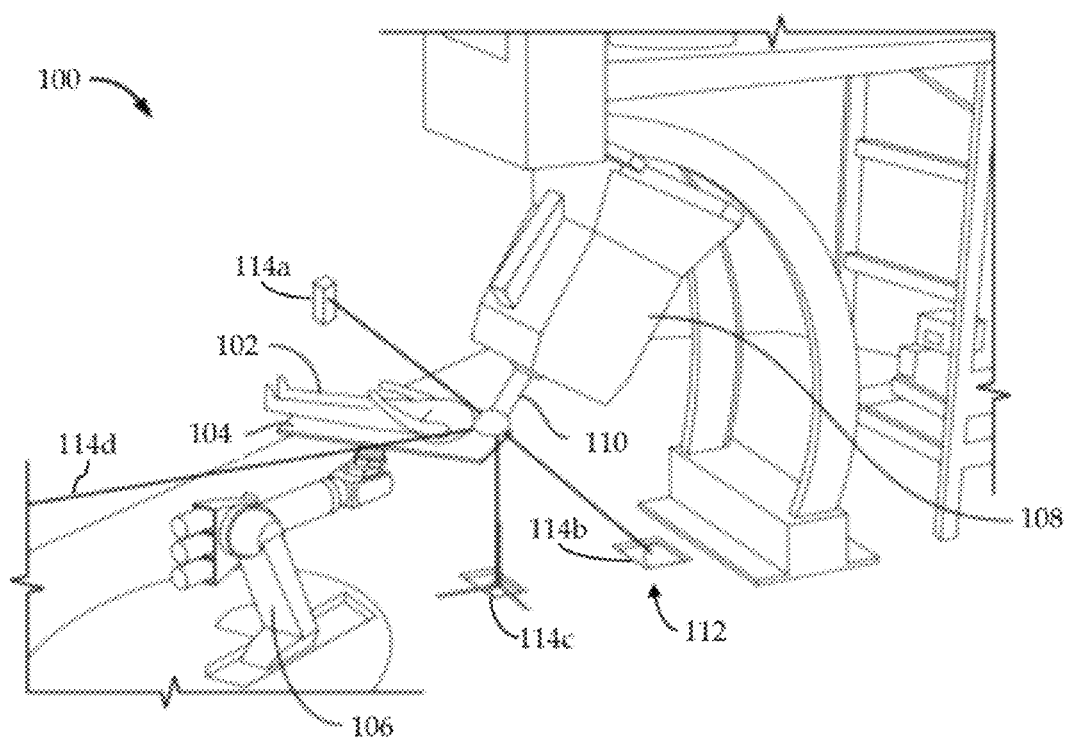
FIG. 1 is a perspective view illustrating, at a high-level, the components comprising a typical robotic proton therapy treatment room.

In the drawings, similar elements will be similarly numbered whenever possible. However, this practice is simply for convenience of reference and to avoid unnecessary proliferation of numbers, and is not intended to imply or suggest that my invention requires identity in either function or structure in the several embodiments.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled.

In an embodiment of the invention, a method and system for improved robot safety and collision avoidance which allows for intended contact between robot components and specific, identifiable objects in the environment of a robot with which contact is intended is provided.

FIG. 1 is a perspective view illustrating, at a high-level, the pieces of equipment in a robotic proton therapy treatment room 100. A patient 102 is lying down on a couch 104 of a patient positioning system 106. In this embodiment, an inclined beam proton delivery system 108 is adapted to deliver beams at a selected angle, e.g., 30 degrees off the vertical. The proton delivery system 108 includes a nozzle 110. The nozzle 110 includes an extendable component referred to as a snout that may include a collimator and a compensator for focusing the proton beam so as to conform the proton beam to the shape of a targeted volume of interest. During a treatment session, it is often necessary, as part of a treatment plan, to change or reconfigure the snout, e.g., moving it in or out of the nozzle 110, or making changes to the collimator and compensator when going from one field to the next in delivering a sequence of fields (Note: a field is delivery of treatment from one beam of radiation at a particular configuration).

A critical aspect of radiation therapy is accurate and precise placement of the patient 102 with respect to the radiation delivery system 108. The patient positioning system 106 may position the patient in six degrees of freedom: translation along the x, y, and z axes, roll, pitch and yaw. To orient the patient 102 with respect to the radiation delivery system 108, all equipment is first modeled with respect to the treatment room coordinate system.

In addition, accurate patient positioning requires modeling of the patient 102. This occurs, at least twice, initially prior to treatment and again during the treatment session itself. To enable accurate placement of the patient 102, the patient 102 is imaged using various imaging systems such as CT scanner and magnetic resonance imaging ("MRI"). By way of example, I have illustrated in FIG. 1 a 3D imaging system 112 comprising several imaging components 114a-d of conventional form.

Figure 2:
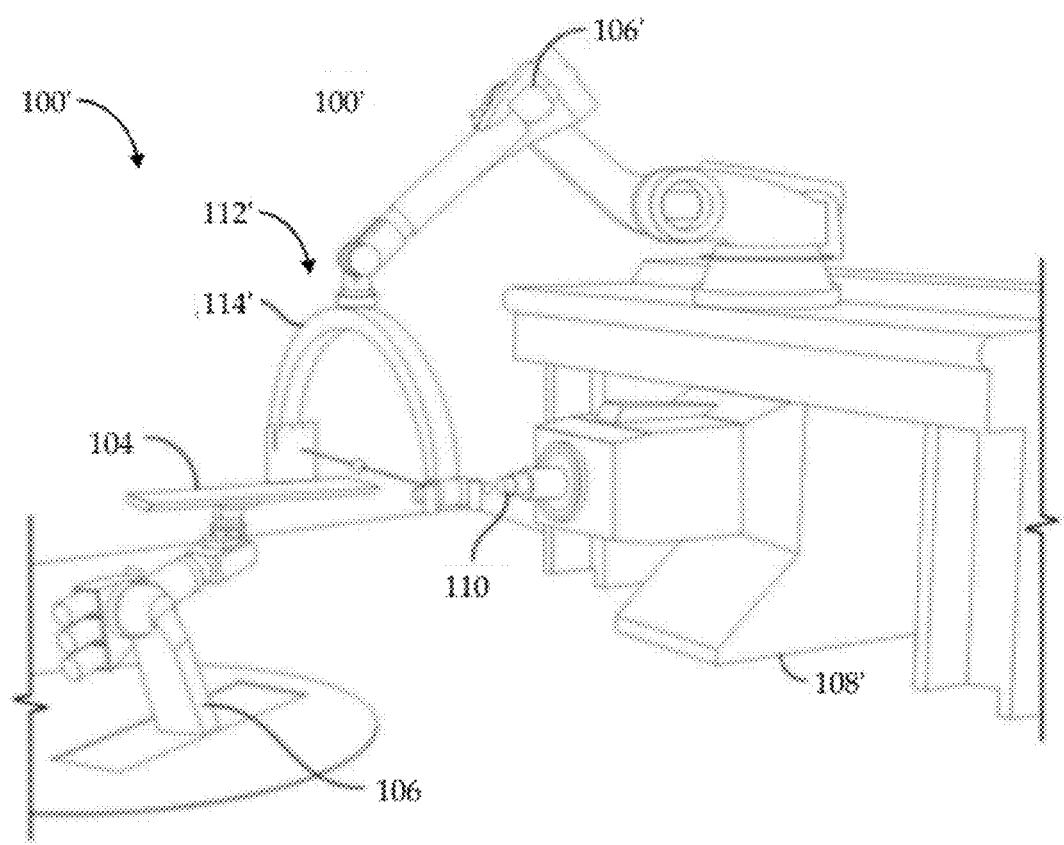
FIG. 2 is a perspective view of one type of imaging system that may be used to image a patient in conjunction with a fixed horizontal beam proton treatment system such as that shown in FIG. 1.

FIG. 2 is a perspective view of a 2D imaging system 112' that may be used to image a patient 102 (for structural clarity only the workcell 100' is shown) in conjunction with a fixed horizontal beam proton treatment system 108'. The imaging system 112' comprises a robotic device having a C-arm 114' that may be moved relative to the patient 102 to permit imaging the patient 102 using a robot 106' to create a 3D image of the patient 102 as a composite of a large set of 2D images taken from a large range of angles and from many different vantage points along the length of the patient 102.

During operation of the robotic equipment 106-106' of a proton therapy treatment room 100-100', for example, it is very important to avoid collisions between the various pieces of robotic equipment 106-106', the patient 102, other equipment in the treatment room 100-100', and the radio therapists (not shown, but ordinarily present) operating the various equipment systems.

Figure 3:
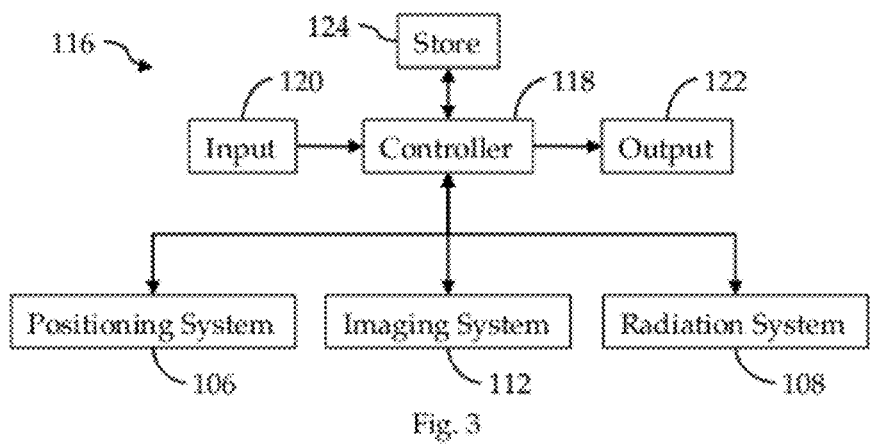
FIG. 3 illustrates, in block diagram form, a radiation therapy control system adapted to control in accordance with my invention the several component systems comprising the proton therapy treatment room shown in FIG. 1.

Shown in FIG. 3 is a radiotherapy control system 116 adapted to control at least the primary component equipment systems used in a treatment room 100-100', e.g., the positioning system 106, the radiation system 108-108', and the imaging system 112-112'. In one embodiment, control system 116 may comprise a controller 118, typically a server-grade computer unit or the like, adapted to operate in response to operator commands provided via an input unit 120, typically a combination of key entry and pointer devices, and to provide operator output via an output unit 122, typically at least one high-resolution, color display monitor. As is known, the control system 116 is generally adapted to fulfill operator commands by executing one or more selected application software programs stored on a store 124, typically a high-capacity, high-speed disk storage unit. In addition, it is known to employ the store 124 to store, at least temporarily, data collected from the several component systems during operation for operator review, either in real-time or off-line.

In general, the systems, components and techniques described above are typical of many types of industrial robots. In particular, I have chosen the proton therapy robotic systems illustrated in FIG. 1 through FIG. 3 by way of example, but recognize that my invention may be readily adapted to function effectively in other applications.

I now propose a system and method for robot safety and collision avoidance that will work for pre-programmed applications and also for autonomous robot applications adapted to allow the robot to make contact with objects within its operating environment. In summary, my invention employs training mechanisms, either off-line or on-line or both, to develop a model of the ideal output of each sensor that is used to detect object presence, and then, during operation, compares the modeled output with the actual, real-time sensor value. Of course, the type of sensor modeling required depends on the type of sensor, whether the application is pre-programmed or whether the application is autonomous. Here I propose a technique that combines training, modeling, and operational control software to detect when an object intrudes unexpectedly into an intrusion detection zone surrounding at least the mobile components of the robot. Depending on the location of the intrusion and the robot motion properties at that point, operational options include, inter alia, selectively slowing or stopping robot motion (if motion is towards the intrusion), or continuing robot motion (if motion is away from intrusion).

Figure 4:
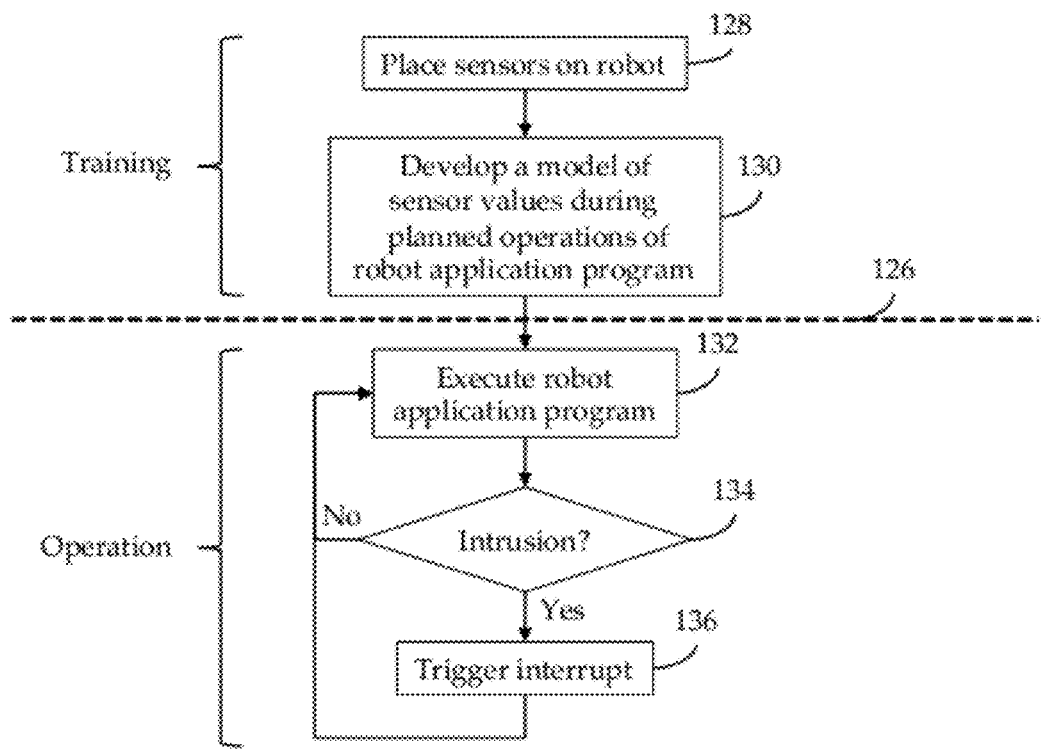
FIG. 4 is a very high level flow-chart illustrating a method for operating any of robotic sub-systems illustrated in FIG. 1 and FIG. 2 so as to avoid undesired collisions according to one embodiment of my invention.

In one embodiment, by way of example, the robot imaging system 112 can be operated in accordance with the flow diagram of FIG. 4. During a training phase (comprising those steps above dashed line 126), a plurality of sensors (to be discussed further below) are attached at selected locations (to be discussed further below) on the robot 106. (step 128). A model of the robot 106 is then developed to determine the expected set of sensor values during all planned operations of a selected robot application software program (step 130). During normal system operation (comprising those steps below dashed line 126), controller 118 (see, FIG. 3) executes the selected robot application program (step 132). Substantially simultaneously, the imaging system 112 is actively monitoring for intrusions (to be discussed further below) (step 134). So long as no intrusion is detected, execution of the application program proceeds normally; upon intrusion detection, however, an interrupt is triggered (step 136) to redirect the application program to an intrusion exception handling routine. Depending on a number of important factors, including system hardware and application, the intrusion exception handling routine may be adapted to selectively modify the normal behavior of the robot application program, including, e.g., slowing, stopping or reversing the current robot motion. Of course, other corrective actions may be initiated when actual sensory signals do not correlate to expected sensory signals, including, inter alia, alerting the operator(s), shutting down or otherwise rendering harmless other system components, or, in some cases, immediately shutting down the entire system.

Figure 5A:
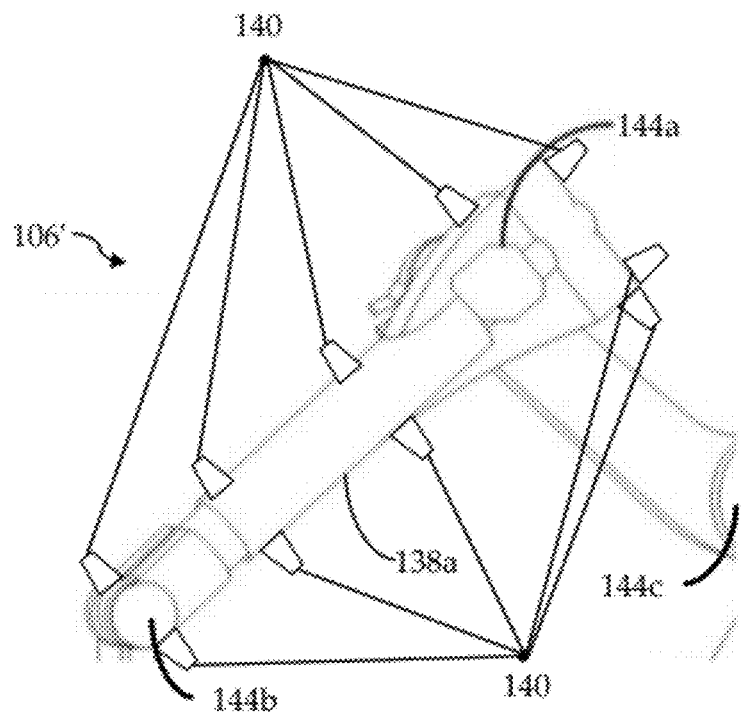
FIGS. 5a-b, illustrates components of the imaging robot of FIG. 2 that has been instrumented with proximity sensors in accordance with my invention.
Figure 5B:
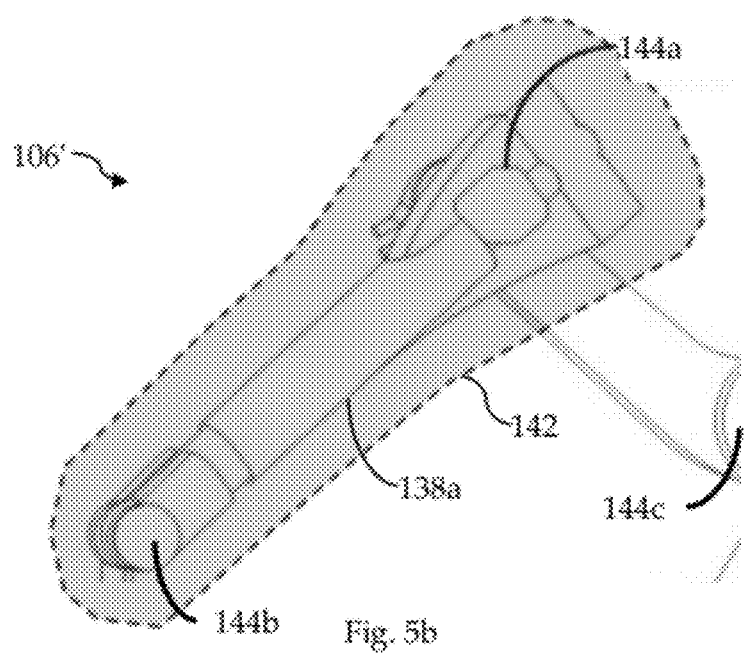

By way of example, I have illustrated in FIG. 5a a representative link 138a of a robot manipulator arm 106' instrumented with a number of proximity sensors 140. In particular, as shown in FIG. 5b, link 138a of the robot 106' is instrumented such that the combined set of sensors 140 creates an intrusion detection zone 142 completely surrounding that link 138a. As I will describe in greater detail below, the number and placement of these sensors 140 is determined through 3D geometric analysis of their volumetric range, any physical mounting constraints, and the shape of the link 138a being instrumented.

Figure 6:
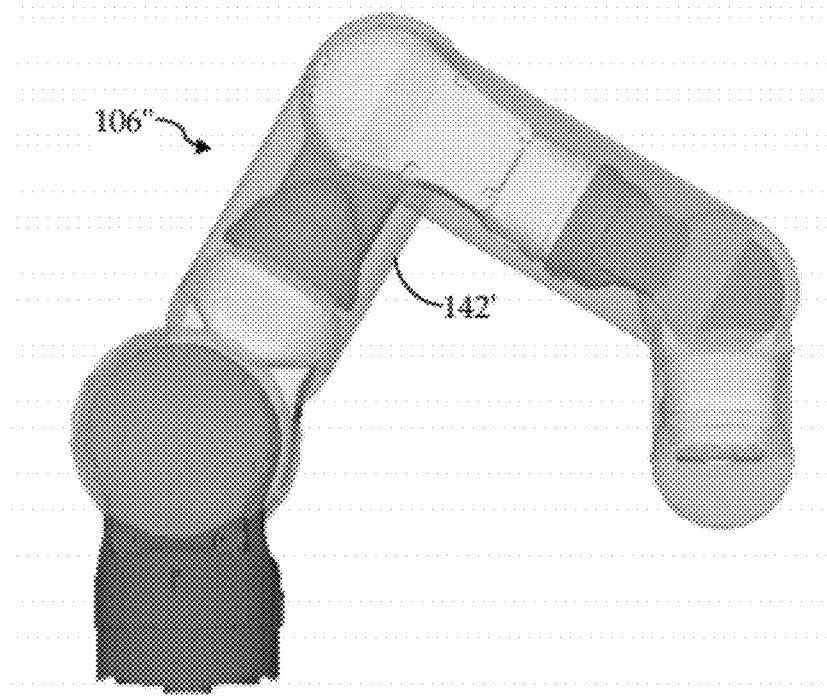
FIG. 6 is an alternate embodiment of a general utility robot having an enveloping intrusion detection zone of varying depth.
Figure 7:
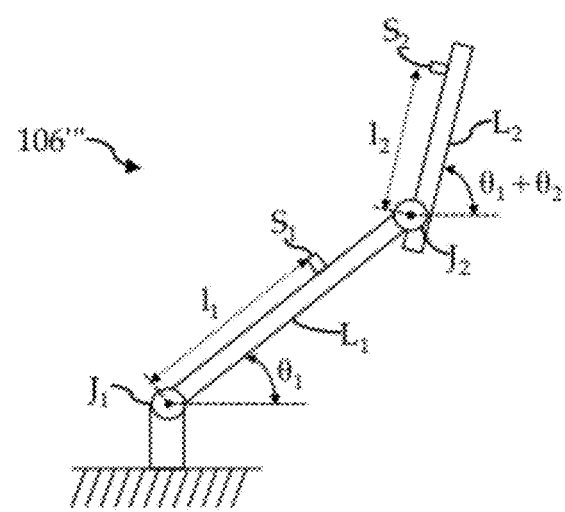
FIG. 7 is a mechanical representation of a simple robot illustrating pertinent parameters for sensor placement.

Once robot 106' has been fully instrumented with such sensors 140, the robot 106' must be moved through all possible positions, by finite steps, and, for each step, the state of each sensor 140 recorded; the set of all such recordings represents the initial model of the robot 106'. It will be recognized that, as each link 138a is rotated about a respective joint 144a-c, one or more sensors 140 may detect an adjacent component of the robot 106'; each such false intrusion may be marked as accepted so as to result in no exception event. In most, if not all, applications, the depth of the intrusion detection zone 140 will vary from sensor to sensor, generally as a function of the stopping distance of the robot in the direction of motion of the respective link 138a or joint 144a-c. In FIG. 6, I have instrumented a known industrial robot manipulator 106" (sensors not shown) so as to implement a variable depth intrusion detection zone 142'.

Based on the application, different training methods may be used. The two primary categories (extremes) of application are: structured or fully pre-programmed; and unstructured or autonomous. For structured applications, at the design time of a robot application, the robot 106, its workcell 100, and the application program logic are all fully specified. If an object is non-stationary, such as another robot, human, etc., then the motions each go through are also specified. This way, a human operator that is going to work in proximity to a robot 106 will have a specific motion profile that they are expected to follow. Given all these specifications, a time based map of the status of each proximity sensor 140 is developed during the training step 130. This map basically identifies the valid values of each sensor with respect to time and to the various operating states of the application.

For the other extreme, where the robot 106 and operational environment is not know, a priori, a real-time computational model may be employed to compute what the valid values of each sensor 140 should be, based on the anticipated state of the system 116. In general, this model geometrically defines the location of each sensor 140, and updates its position based on actual position of the linkage or component on which the sensor 140 is mounted. In the case of a simple mobile robot (not shown), the position of each sensor may be computed as a function of the Cartesian position of the mobile robot and a 3D transformation offset that defines where the sensor is mounted relative to the robot origin. In the case of an articulated robotic arm or manipulator, the location of each sensor may be computed based on forward position analysis of the articulated robot arm or manipulator.

Upon detecting an unexpected intrusion, appropriate corrective action may be initiated. In general, the appropriate action will depend, at least in part, on the rate of closure of the endangered robot component and the unexpected intruding object. Known techniques for computing relative distance and rate of change of that distance are disclosed in detail, e.g., in Spencer, et al., "Collision Avoidance Techniques for Tele-Operated and Autonomous Manipulators in Overlapping Workspaces", 2007 [http://www.robotics.utexas.edu/rrg/docs/pubs/publications/ICRA08-CollisionAvoidance.pdf]; incorporated herein in its entirety by reference.

Consider, for example, the simple, planar robot manipulator 106', comprising two joints, $J_1$ and $J_2$, and two links, $L_1$ and $L_2$. (Note: for convenience of reference, each of the illustrated links are referred to herein by their respective link lengths, i.e., $L_1$ and $L_2$.) The position of joint $J_1$ relative to the base of the robot 106''' is defined by the angle $\theta_1$, and the position of joint $J_2$ is defined relative to link $L_1$ and is equal to the angle $\theta_2$. A first proximity sensor, $S_1$, is mounted on link $L_1$ at a distance of $l_1$ from the rotational axis of joint $J_1$, and a second proximity sensor, $S_2$, is mounted on link $L_2$ at a distance of $l_2$ from the rotational axis of joint $J_2$. Mathematically, the position, (x, y), of each proximity sensor in Cartesian space (in this case 2D space) may be developed as follows:

Position of sensor $S_1$:

$$x_1 = (l_1 * \cos(\theta_1));$$

$$y_1 = (l_1 * \sin(\theta_1));\text{ and}$$

Position of Sensor $S_2$:

$$x_2 = (L_1 * \cos(\theta_1) + l_2 * \cos(\theta_1 + \theta_2));$$

$$y_2 = (L_1 * \sin(\theta_1) + l_2 * \sin(\theta_1 + \theta_2)).$$

As the robot 106''' moves, the respective positions of all such sensors can be computed using a known robot kinematics computation generally referred to as the forward position solution. This formulation may be easily extended to robots having more complex 3D geometry, and are thus not constrained to motion in 2D space. In general, I determine sensor placement to achieve two primary results: full inclusion of all of the several components of the robot within the desired scope of the intrusion detection zone; and minimal number of sensors while maintaining a selected level of redundancy to facilitate detection of sensor failures and to minimize false trigger events.

The positioning of proximity sensors may be best illustrated by a set of examples. As is known, the field-of-view ("FOV") of a proximity sensor, and the shape of that FOV can vary for different sensor types, as shown by way of example in FIG. 8. As such sensors develop further, they may be capable of not only detecting objects in their range, but also identifying the coordinates of the intrusion.

For illustration purposes, I will assume that a CCD camera type proximity sensor is to be employed; as is known, this sensor has a substantially conical FOV and can be set to detect an intrusion within a selected distance, d, from the optical window of the camera. In FIG. 9, I have illustrated embodiments placing a number of such sensors on robot links of different shape:

Case 1: A rectangular link with all angles between different faces of the link being 90° as shown in FIG. 9a. For the top face of the link, first fit a square to the FOV of the sensor (located at the center as indicated by the small circle) at the appropriate depth, d, as shown in FIG. 9b; each side of the square will, therefore, be of size w, where $w = \text{sqrt}(2) * d * \tan(\theta/2)$. For sensor placement purposes, I will assume that each sensor will detect an intrusion at distance d and w×w area. Assuming the length of the face of the illustrated robot link is $l_r$ and width is $w_r$, the maximum distance between any two sensors can be d. This will provide full coverage of the given face of the robot link as shown in FIG. 9c. Assuming that $n_1$ is the number of sensors placed along the length of the robot link, then:

$$n_l > l_r / (2 * w).$$

Similarly, if $n_w$ is the number of sensors placed along the width of the robot link, then:

$$n_w > w_r / (2 * w).$$

The same method of sensor placement, when applied to each face of the rectangular link, will develop an intrusion detection envelope of depth d surrounding the link.

Case 2: A rectangular link where the angle between any two faces may not be 90° as shown in FIG. 9d. FIG. 9e illustrates a side view of one surface of this link having an angle, $S_{angle}$, greater than 90° between two adjacent, contiguous faces. As $S_{angle}$ decreases, e.g., as a result of a joint rotation, any two sensors that are mounted at the edge interface between the two faces will tend to move away from each other, requiring that additional sensors (indicated by arrows as shown in FIG. 9f) be placed along the joint to maintain full coverage.

With reference to the illustration of FIG. 9g, the number of edge sensors that will be required to get full coverage can be computed as:

$$\text{No. of Edge Sensors} \geq (180 - \emptyset - S_{angle})/\emptyset$$

where: $\emptyset = 2 * \arctan(\tan(\theta/2)/\text{sqrt}(2))$

Figure 9H:
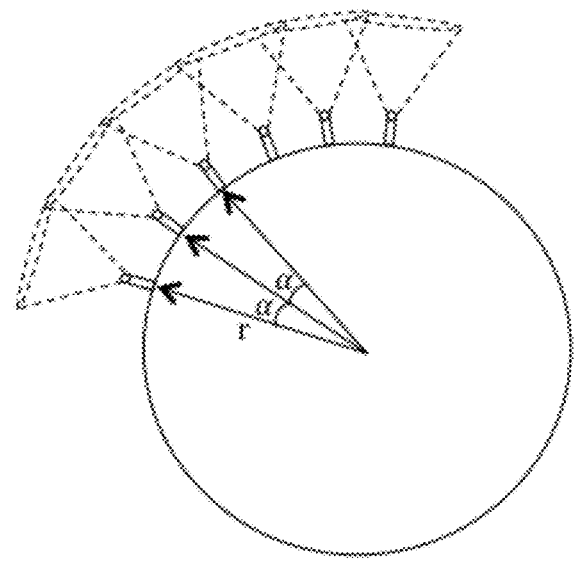

Case 3: Cylindrical link. In the case of a cylindrical link, the placement along the length of the cylinder will be similar to that along the length of a face of a rectangular link; the placement along the circumference of the cylinder requires a different formulation. Shown in FIG. 9h is the cross section of a cylinder of radius r with a representative placement of proximity sensors around it. In general, the proximity sensors are placed regularly around the circumference of the cylinder at an angle, $\alpha$, with respect to each other. The value of $\alpha$ that would provide full coverage of this cross-section of the cylindrical link can be computed as:

$$\alpha = 2 * \arctan((d * \tan(\theta/2))/(d+r)).$$

Figure 9I:
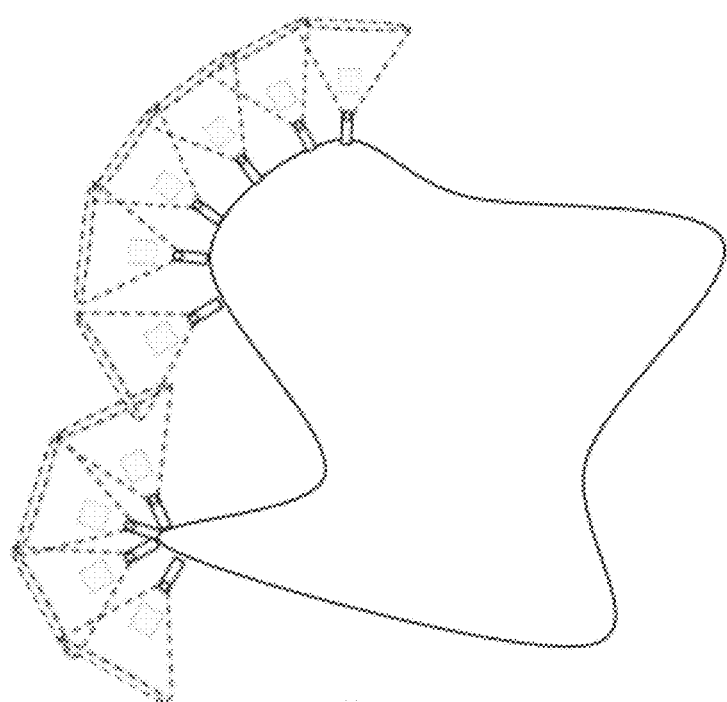

Case 4: General geometric link. On an arbitrary shaped robot link having an irregular curvilinear cross-section as shown in FIG. 9i, I have positioned proximity sensors on an especially problematic portion thereof so as to achieve full coverage. In general, the known mathematical formulations for rectangular and cylindrical links can be extended to the generic shaped link, and can be related both to the curvature of the cross-section and to the curvature orthogonal to the direction of the cross-section. Alternatively, known computer graphics or ray tracing techniques can be used to iteratively place the sensors on the surface, and then to verify that full coverage is achieved.

In summary, in accordance with my invention, model training and operational sensing are correlated to detect real-time deviations from expected behavior. Unlike purely sensor driven systems that will detect any intrusion without knowing which, if any, may be valid and which are not, my invention allows the system to selectively accept intrusions which can be anticipated during normal operation while triggering on unexpected intrusions.

From the foregoing it will be apparent that I have provided a system and method that allows for expected intrusions into the operating environment of a robot and that detects unexpected intrusions, thereby allowing the robot to interact with other pieces of equipment and human operators while discerning and distinguishing intrusions that may cause harm to equipment and personnel. Those skilled in the art will recognize that modifications and variations can be made without departing from the spirit of my invention. Therefore, I intend that my invention encompass all such variations and modifications as fall within the scope of the appended claims.

What I claim is:

1. A robot safety system comprising:
   a robot having a plurality of mobile components, each instrumented with a plurality of proximity sensors adapted to develop a respective intrusion detection zone substantially surrounding said mobile component, each sensor adapted to detect an intrusion into a respective portion of the zone;
   a model of at least one predefined robot application comprising, for each of the intrusion detection zones, a set of accepted intrusions during each of a plurality of predefined time intervals comprising the application;
   a controller adapted to:
      control the robot to execute the application;
      during each time interval of the application, monitor for detected intrusions into each of the intrusion detection zones; and
      trigger an interrupt of the application in response to a detected intrusion into any one of said intrusion detection zones not in the set of accepted intrusions for said one intrusion detection zone for the respective time interval.

2. A method for operating a robot having a plurality of mobile components, the method comprising the steps of:
   during a first time period:
      instrumenting a robot with a plurality of proximity sensors so as to develop a respective intrusion zone substantially surrounding each of the mobile components of the robot, each sensor adapted to detect an intrusion into a respective portion of the zone; and
      modeling at least one predefined robot application to develop, for each of the intrusion detection zones, a set of accepted intrusions during each of a plurality of predefined time intervals comprising the application;
   during a second time period:
      executing the application;
      during each time interval of the application, monitoring for detected intrusions into each of the intrusion detection zones; and
      triggering an interrupt of the application in response to a detected intrusion into any one of said intrusion detection zones not in the set of accepted intrusions for said one intrusion detection zone for the respective time interval.

3. A robot safety system comprising:
   a robot having a plurality of mobile components, each instrumented with a plurality of sensors so as to develop a respective intrusion zone substantially surrounding said mobile component, each sensor adapted to develop a respective sensor signal;
   a model of at least one predefined robot operation comprising a set of expected sensor signals for each sensor at each of a plurality of predefined time intervals comprising the operation;
   a controller adapted to:
      control the robot to execute the operation;
      at each of the predefined time intervals, correlate the sensor signal developed by each of the sensors during the operation to the respective expected sensor signal; and
      signaling an exception if the developed sensor signal and the expected sensor signal do not correlate.

4. The method of claim 3, wherein the modeling is further characterized as comprising:
   a model of robot components, workcell equipment and operators comprising a set of expected sensor signals for each sensor at predefined time intervals in an operation of the robot due to intrusions of other robot components, workcell equipment and operators.

5. The method of claim 3, further comprising the step of:
   in response to a signaled exception indicative of an unexpected intrusion of an object, determining a corrective action so as to avoid undesired collision with the intruding object.

6. A method for operating a robot, comprising the steps of:
   instrumenting a robot with a plurality of sensors so as to develop an intrusion zone surrounding each of a plurality of mobile components of the robot, each sensor adapted to develop a respective sensor signal;
   modeling at least one predefined robot operation to develop an expected sensor signal for each sensor at each of a plurality of predefined time intervals comprising the operation;
   executing the operation;
   at each of the predefined time intervals, correlating the sensor signal developed by each of the sensors during the operation to the respective expected sensor signal; and signaling an exception if the developed sensor signal and the expected sensor signal do not correlate.

7. The method of claim 6, wherein the modeling step is further characterized as comprising:
    modeling robot components, workcell equipment and operators to determine expected sensor signals for each sensor at predefined time intervals in an operation of the robot due to intrusions of other robot components, workcell equipment and operators.

8. The method of claim 6, further comprising the step of:
    in response to a signaled exception indicative of an unexpected intrusion of an object, determining a corrective action so as to avoid undesired collision with the intruding object.

9. The method of claim 8, further comprising the step of:
    determining a distance between the intruding object and a nearest movable component of the robot; and
    determining a rate of change of the determined distance.

10. The method of claim 6, wherein the modeling step is further characterized as comprising:
    modeling robot components to develop a time based map of the signal developed by each sensor during each time interval of the operation.

11. A method for improved safety of industrial robots by avoiding undesired collisions, comprising:
    instrumenting a robot with a plurality of sensors to create an intrusion zone around each of a plurality of movable components of the robot, each sensor adapted to develop a sensor signal during an operation of the robot;
    modeling each robot component to determine expected sensor signals for each sensor at predefined time intervals in the operation of the robot due to intrusions of other robot components; and
    during each time interval of the operation of the robot:
        correlating each developed sensor signal to the respective expected sensor signal; and
        signaling an exception in response to a non-correlation.

12. The method of claim 11, further comprising the step of:
    modeling movements of workcell equipment and operators to determine expected sensor signals due to intrusions of the workcell equipment and operators.

13. The method of claim 11, further comprising the step of:
    in response to a signaled exception indicative of an unexpected intrusion of an object, determining a corrective action so as to avoid undesired collision with the intruding object.

14. The method of claim 13, further comprising the step of:
    determining a distance between the intruding object and a nearest movable component of the robot; and
    determining a rate of change of the determined distance.

15. The method of claim 11, wherein the modeling step is further characterized as comprising:
    modeling robot components, workcell equipment and operators to determine expected sensor signals for each sensor at predefined time intervals in an operation of the robot due to intrusions of other robot components, workcell equipment and operators.

16. The method of claim 11, wherein the modeling step is further characterized as comprising:
    modeling robot components to develop a time based map of the signal developed by each sensor during each time interval of the operation.

17. The method of claim 11, wherein each sensor is adapted to detect proximity of objects.

* * * * *